3,439,633
APPARATUS AND PROCESS FOR MANUFACTURING SPHERICAL CORES FOR AN ORALLY ADMINISTRABLE SUBSTANCE

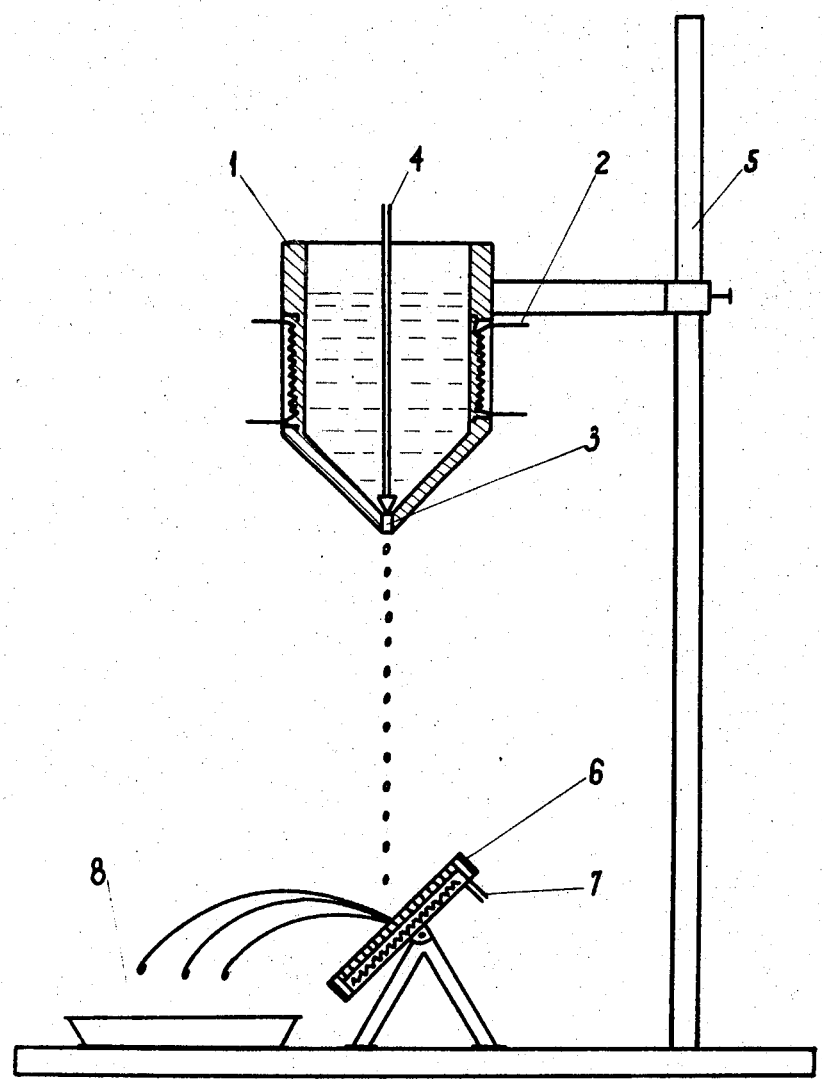

Zbigniew Pawlak, Asfaltowa FA. M13; Kazimierz Michalski, Praga Pot, Korytnidky 23—16; and Jerzy Surowiecki, Pragaii, Namystowska 3/23, all of Warsaw, Poland
Filed Apr. 17, 1967, Ser. No. 631,446
Claims priority, application Poland, Apr. 16, 1966, P 114,058
Int. Cl. B22d 23/08
U.S. Cl. 107—54          10 Claims

ABSTRACT OF THE DISCLOSURE

A method in which a sugar melt is discharged dropwise by gravity onto a heated inclined surface from a height such that the drops splatter upon striking the surface and form hardened spherical droplets which fall directly into a collector.

Brief summary of the invention

Recently there have appeared drugs for oral administration, especially of a delayed action type, having the form of fine, spherical granules called "spansules."

This form of drug for oral administration has become popular, and its use is becoming as widespread as conventional oral drugs such as tablets or dragees. A suitable process for the manufacture of "spansules" has not yet been described in the professional literature.

Tests have shown that the main difficulty in manufacturing drugs of this kind is in making perfectly spherical cores, which are then coated with a layer of pharmacologically active substance and with a protective coating.

The spherical cores or granules can be made, for example, from crystal sugar or from irregular grains of granulate, containing a pharmacological active substance, by means of mechanical or pneumatic working. However, the aforesaid processes are inconvenient and involve considerable losses of substance.

An object of the invention is to provide a simple process for making small balls of relatively uniform size from various sugars, said balls being suitable as cores for a further coating operation.

According to the invention a melted mass of poly- or monosaccharides containing water is discharged dropwise from a height onto an inclined metal plate, heated to a high temperature of about 500° C. The drops splash and form small droplets which do not directly contact the plate surface, because of an isolation with steam, according to the Leidenfrost effect.

The droplets rebound from the plate and fall into a receiver, in the form of small spherical granules.

The height from which the droplets fall as well as the proper angle of inclination of the plate and the distance between the plate and the receiver are a function of the particular kind of mass.

A most important consideration is that the freshly formed granules tend to deformate and conglutinate. In order to avoid such deformation and conglutination, the granules are collected in a receiver, containing an organic solvent.

However, if a solvent of low vapor pressure is used, the separation of said solvent from the product is difficult since in this case heating in vacuum is generally required.

In the event that a low-boiling solvent is used, the problem of its evaporation must be considered.

Heretofore, it was believed necessary, in order to obtain a complete solidification and hardening of the granules in air, that the granules be transferred by a pipeline to a centrifugal separator or filter.

An especially convenient manner of collecting the granules according to the invention is effected in a receiver containing a layer of an inert, pulpy powder, for example, magnesium stearate.

This powder is an excellent medium for the solidification of granules, without the granules undergoing deformation and conglutination with other granules. In cases in which the pharmacologically active substance is resistant to the conditions of the sugar melt, said substance may be dissolved or suspended in said sugar-melt and thereby cores, containing the pharmacologically active substance can be obtained.

A device for manufacturing cores for drugs in fine, spherical granules comprises an insulated vessel for a sugar-melt preferably provided with electrical heating means and having at least one outlet orifice for the dropwise discharge of the sugar-melt.

The device further comprises an inclined metal plate beneath the vessel, heated by electric means, and a receiver for the droplets produced when the drops strike the plate, said receiver being in the form of a tray, containing magnesium stearate.

Advantageously, the plate is mounted on a plate holder for adjustment of the angle of inclination of the plate.

The vertical distance between the vessel and the metal plate as well as the distance between the plate and the receiver are also adjustable.

Brief description of the drawing

The sole figure of the drawing is a diagrammatic illustration of apparatus according to the invention, parts of which are shown in section.

Detailed description of the invention

The invention will be described in greater detail with reference to the drawing. Therein there is shown a vessel 1 for containing sugar and a small amount of water. The vessel contains an electric heater 2 which forms a melt from the sugar and water. The vessel is provided with an orifice 3 at the bottom thereof for the dropwise discharge of the sugar melt. A plug 4 can be utilized for closing the orifice 3. A rod secured to vessel 1, is mounted on a column 5 for adjusting the height of vessel 1.

An inclined metal plate 6 is positioned beneath the orifice 3 and is mounted on a support for adjustment of its angle of inclination. The plate 6 has a smooth upper surface beneath which is secured an electric heater 7. The drops of sugar melt which strike the upper surface of plate 6, splatter and form droplets which fall into a receiver 8 located next to the plate 6.

The tray contains an inert pulpy powder which inhibits deformation and conglutination of the spherical droplets which fall therein and solidify.

The invention will next be described in relation with the following example.

EXAMPLE

A mass constituted of 525 g. of glucose and 10 g. of water is melted in the glass vessel 1. The melt is discharged dropwise from a height of about 1 meter onto metal plate 6, which is heated to a temperature of about 500° C. The metal plate 6 is inclined at an angle of about 45° with the horizontal. The droplets formed from the splashing of the melt drops on plate 6 pass as spherical balls into the receiver 8, containing a layer of powdered magnesium stearate. After screening the balls from the magnesium stearate, a mesh analysis was performed, which shows that the distribution per 100 parts by weight of balls was as follows:

17 parts by weight of balls of diameter below 1 mm.,
70 parts by weight of balls of diameter between 1–1.5 mm.,
13 parts by weight of balls of diameter above 1.5 mm.

Thus, obtained granules have a very hard consistency, an ideal spherical size and are suitable for further coating with various, substances by known techniques.

What is claimed is:

1. A process for manufacturing spherical cores for an orally administrable substance, said process comprising discharging a sugar melt dropwise by gravity onto a heated inclined surface from a height such that the drops splatter upon striking the surface and form spherical droplets, and collecting the droplets from said inclined surface.

2. A process as claimed in claim 1 wherein said droplets leave said surface and fall directly into a container where they are collected.

3. A process as claimed in claim 2 comprising placing an inert powder substance in the container for preventing deformation and conglutination of the droplets.

4. A process as claimed in claim 3 wherein said powder substance is magnesium stearate.

5. A process as claimed in claim 1 wherein said surface is heated to a temperature of 500° C.

6. A process as claimed in claim 1 wherein said melt contains a pharmacologically active substance.

7. A device for carrying out the process as claimed in claim 1 comprising a heated vessel for the sugar melt, said vessel having an outlet at the bottom thereof for dropwise discharge of the melt therefrom, an inclined plate beneath said outlet, and a receiver adjacent said plate for receiving droplets which leave said plate when the drops of the sugar melt splatter on said plate.

8. A device as claimed in claim 7 comprising means supporting said inclined plate for adjustment of the angle of inclination thereof.

9. A device as claimed in claim 7 comprising heating means in said plate for heating the same to a temperature of about 500° C.

10. A device as claimed in claim 7 comprising means supporting said vessel for adjustment of the vertical elevation thereof with respect to said plate.

References Cited

UNITED STATES PATENTS

| 2,488,353 | 11/1949 | Unger | 264—9 |
| 2,572,998 | 10/1951 | Eisner | 18—2.7 |
| 2,786,772 | 3/1957 | Stewart et al. | |
| 3,059,280 | 10/1962 | Laehder | 18—2.7 |

WALTER A. SCHEEL, *Primary Examiner.*

JOSEPH SHEA, *Assistant Examiner.*

U.S. Cl. X.R.

107—27; 18—2.7; 264—13, 15